(12) United States Patent
Matsubara et al.

(10) Patent No.: US 10,078,847 B2
(45) Date of Patent: Sep. 18, 2018

(54) DISTRIBUTION DEVICE AND DISTRIBUTION METHOD

(71) Applicant: YAHOO JAPAN CORPORATION, Tokyo (JP)

(72) Inventors: Ai Matsubara, Tokyo (JP); Eiji Sumitomo, Tokyo (JP); Kazutaka Kimura, Tokyo (JP); Kanta Suzuki, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 595 days.

(21) Appl. No.: 14/316,072

(22) Filed: Jun. 26, 2014

(65) Prior Publication Data
US 2015/0081406 A1    Mar. 19, 2015

(30) Foreign Application Priority Data

Sep. 19, 2013 (JP) ................................ 2013-194653

(51) Int. Cl.
*G06Q 30/00* (2012.01)
*G06Q 30/02* (2012.01)
(Continued)

(52) U.S. Cl.
CPC ....... *G06Q 30/0241* (2013.01); *G06F 3/0485* (2013.01); *G06F 3/165* (2013.01); *G06Q 30/0272* (2013.01)

(58) Field of Classification Search
None
See application file for complete search history.

(56) References Cited

U.S. PATENT DOCUMENTS 9,143,840 B2 * 9/2015 Geller ................ H04N 21/8586
2011/0106630 A1  5/2011 Hegeman et al.
(Continued)

FOREIGN PATENT DOCUMENTS

JP      2007-233906 A    9/2007
JP      2009-268102 A    11/2009
(Continued)

OTHER PUBLICATIONS

Aug. 19, 2014 Office Action issued in Japanese Application No. 2013-194653.

*Primary Examiner* — Jamie R Kucab
(74) *Attorney, Agent, or Firm* — Oliff PLC

(57) ABSTRACT

A distribution device includes a distribution unit which distributes a control program for controlling content to be displayed on a user terminal, to the user terminal. The control program is a display program to be executed in the user terminal, and controls the user terminal to execute a sound playback procedure for playing back a sound when content is included in an area specified by the display program for displaying the content, a viewable area acquisition procedure for acquiring the area specified by the display program in the content as a viewable area, a display area determination procedure for determining whether a display area where a video is displayed corresponding to the content is positioned in the viewable area, and a video playback procedure for stopping playback of the sound and starting playback of the video, when determined that the display area is positioned in the viewable area.

11 Claims, 14 Drawing Sheets

(51) Int. Cl.
*G06F 3/0485* (2013.01)
*G06F 3/16* (2006.01)

(56) References Cited

U.S. PATENT DOCUMENTS

| | | | |
|---|---|---|---|
| 2012/0123874 A1* | 5/2012 | Park | G06Q 30/0273 |
| | | | 705/14.69 |
| 2013/0305170 A1* | 11/2013 | de Souza | G06F 3/0485 |
| | | | 715/760 |
| 2017/0161239 A1* | 6/2017 | Newton | G06F 17/30861 |
| 2017/0221106 A1* | 8/2017 | Sanghavi | G06Q 30/0267 |

FOREIGN PATENT DOCUMENTS

| | | |
|---|---|---|
| JP | 2011-128204 | 6/2011 |
| JP | 2012-525624 A | 10/2012 |
| JP | 2013-510371 A | 3/2013 |

\* cited by examiner

| URL | CONTENT DATA |
|---|---|
| http://www.abcde.co.jp/xxx/ | CONTENT 1 |
| http://www.abcde.co.jp/yyy/ | CONTENT 2 |
| http://www.abcde.co.jp/zzz/ | CONTENT 3 |
| ⋮ | ⋮ |

| ADVERTISEMENT ID | NUMBER OF TIMES OF PLAYBACK |
|---|---|
| A001 | 50.1 |
| A002 | 39.0 |
| A003 | 61.0 |
| ⋮ | ⋮ |

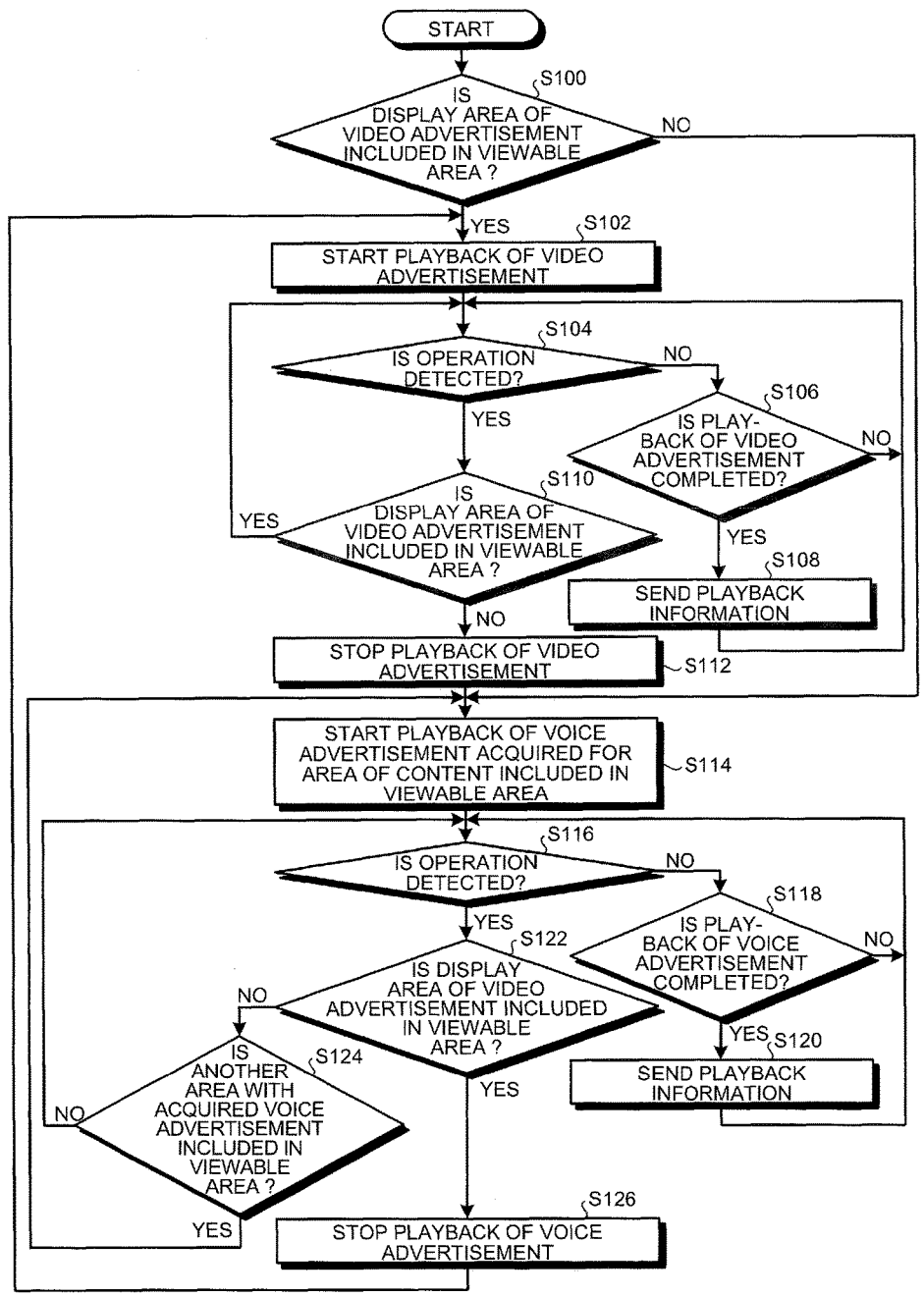

DISTRIBUTION DEVICE AND DISTRIBUTION METHOD

CROSS-REFERENCE TO RELATED APPLICATIONS

The present application claims priority to and incorporates by reference the entire contents of Japanese Patent Application No. 2013-194653 filed in Japan on Sep. 19, 2013.

BACKGROUND OF THE INVENTION

1. Field of the Invention

The present invention relates to a distribution device, a distribution method, and a distribution program.

2. Description of the Related Art

Japanese Patent Application Laid-open No. 2011-128204 discloses an advertisement distribution device, which displays an advertisement in a display area, when the display area of an advertisement is included in an area displayed on a screen of a web browser, of areas of a web page.

In the technique of Japanese Patent Application Laid-open No. 2011-128204, no suggestion is especially made on a technique for transmitting information other than text information in content, during the time until a display area of an advertisement is included in a viewable area. Thus, there is no solution for providing information regarding, for example, products or services to viewers, during the time.

SUMMARY OF THE INVENTION

It is an object of the present invention to at least partially solve the problems in the conventional technology.

According to one aspect of an embodiment, a distribution device includes a distribution unit configured to distribute a control program for controlling content displayed on a user terminal, to the user terminal, and wherein the control program controls the user terminal to execute a sound playback procedure for playing back a sound, when the content is displayed on a screen of the user terminal, a viewable area acquisition procedure for acquiring information on a viewable area displayed on the screen of the user terminal in the content, a display area determination procedure for determining whether the display area as a display area where a video is displayed and included in the content is positioned in the viewable area, and a video playback procedure for stopping playback of the sound and starting the playback of the video in the display area, when determined that the display area is positioned in the viewable area.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a flowchart illustrating an example of an operation of the user terminal in the first embodiment;

DETAILED DESCRIPTION OF THE PREFERRED EMBODIMENTS

First Embodiment

Descriptions will be made to a first embodiment with reference to the drawings.

Scheme of Process

Figure 1:
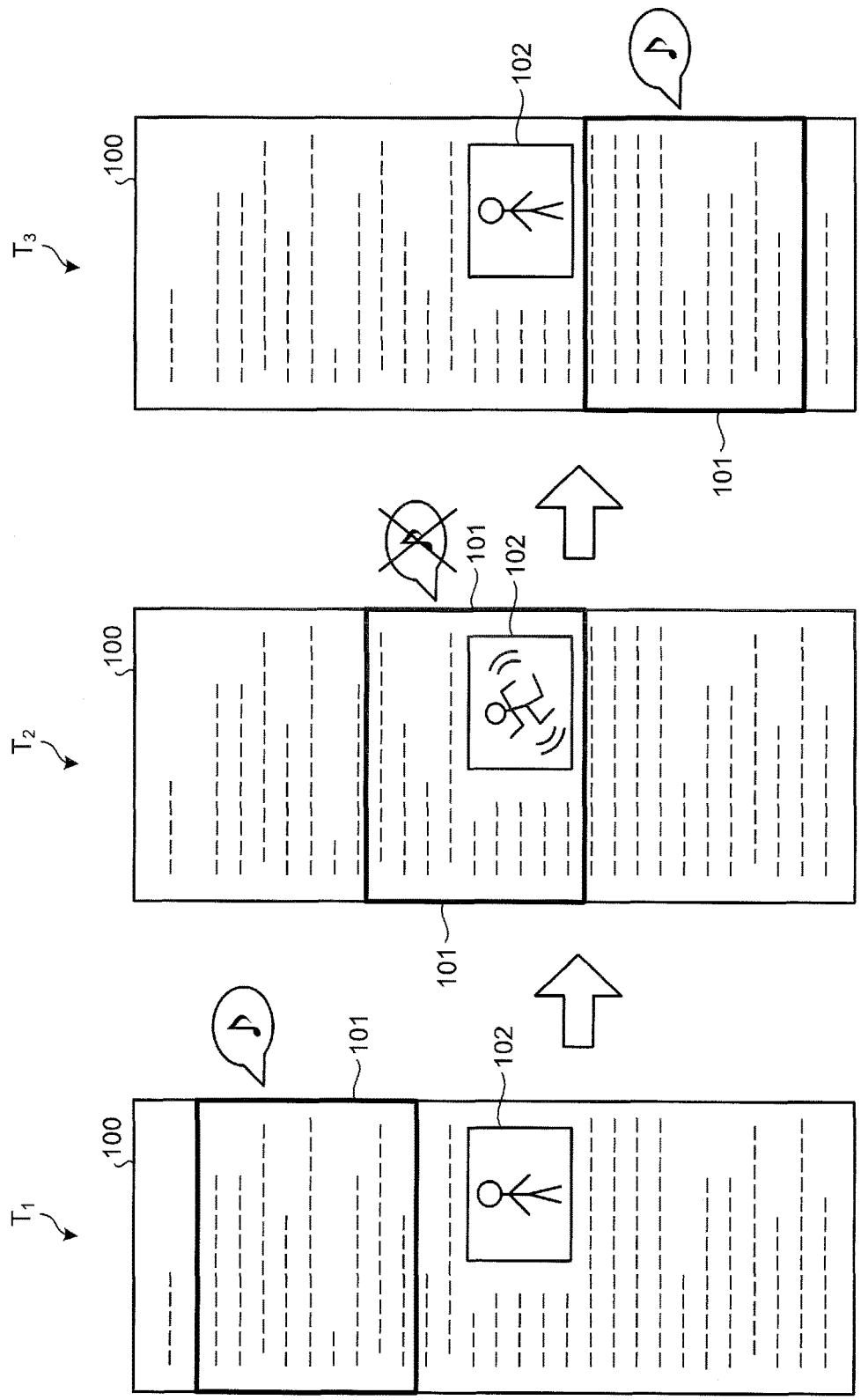
FIG. 1 is a schematic diagram for explaining a schematic example of a process in a first embodiment.

FIG. 1 is a schematic diagram for explaining a schematic example of a process in the first embodiment. A user terminal acquires content data distributed from a distribution device, and creates content 100 based on the acquired content data. The user terminal displays the created content 100 on a screen of the user terminal.

The content 100 in the embodiment includes a display area 102 of a video that is a display area where a video is displayed. The video is played back in the display area 102. The content 100 in this embodiment corresponds to a sound to be played back in each area to be displayed on the screen of the user terminal. In this embodiment, the sound to be played back in each area of the content 100 is, for example, a voice advertisement, while the video to be played back in the display area 102 is, for example, a video advertisement.

In this embodiment, the content data to be distributed from the distribution device to the user terminal includes a control program. In this embodiment, the content 100 is, for example, a Web content. The control program is, for example, a JavaScript (registered trademark). The user terminal executes the control program to control playback of a voice advertisement for each area of the content 100 and to control playback of a video advertisement in the display area 102.

For example, at a time $T_1$ of FIG. 1, the user terminal displays an area of the content 100 on the screen of the user terminal, and plays back a voice advertisement acquired for this area. At this stage, the video advertisement is not played back in the display area 102. Of areas of the content 100, an area to be displayed on the screen of the user terminal will hereinafter be referred to as a viewable area 101.

A user operates the user terminal to scroll the content 100 on the screen of the user terminal. For example, at a time $T_2$ of FIG. 1, when the display area 102 of a video in the content 100 is included in the viewable area 101, the user terminal stops playback of the voice advertisement. Then, the user terminal plays back the acquired video advertisement, in the display area 102. When the video advertisement is video with a sound, the user terminal plays back this video in the display area 102 and plays back this sound.

The user operates the user terminal to further scroll the content 100 on the screen of the user terminal. For example, at a time $T_3$ of FIG. 1, when the display area 102 of a video in the content 100 is not included in the viewable area 101, the user terminal stops playback of the video advertisement in the display area 102. The user terminal plays back an acquired voice advertisement for the area included in the viewable area 101 of the content 100.

When the video to be played back in the display area 102 is a video advertisement, it is not possible to request the user of the user terminal for a product or service indicated by the video advertisement, until the display area 102 is included in the viewable area 101. The distribution device in this embodiment distributes a control program for controlling the user terminal to play back the sound of the voice advertisement, to the user terminal, when the display area 102 is not included in the viewable area 101. As a result, the distribution device can provide the user of the user terminal with information regarding the product or service, through the sound of the voice advertisement, even when the display area 102 is not included in the viewable area 101. Even if the sound is not directly an advertisement, information for recalling the product or service of the video advertisement is generated through a sound, thereby complementing the content of the video advertisement. For example, in the case of a video advertisement regarding character goods, it is considered to generate a sound of the corresponding character, until the video advertisement is generated.

Configurations of Distribution System 10 and Distribution Device 20

Figures 2, 3:
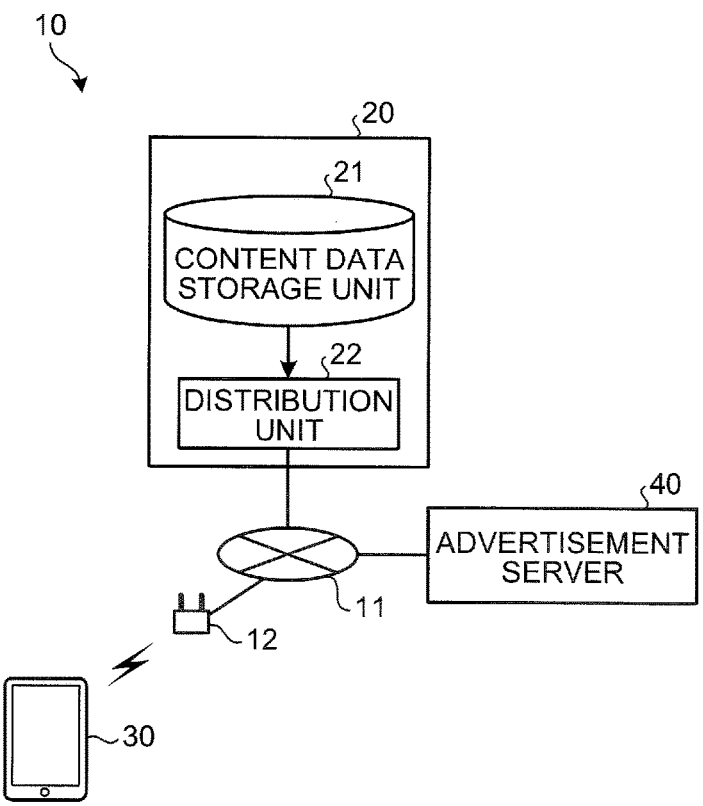
FIG. 2 is a system configuration diagram illustrating an example of a distribution system in the first embodiment.
FIG. 3 is a diagram illustrating an example of a structure of data stored in a content data storage unit.

FIG. 2 is a system configuration diagram illustrating an example of a distribution system in the first embodiment. A distribution system 10 in this embodiment includes a distribution device 20, a user terminal 30, and an advertisement server 40. The distribution device 20 and the advertisement server 40 are connected to a communication line 11, and can send and receive communication data through the communication line 11.

The distribution device 20 has a content data storage unit 21 and a distribution unit 22. FIG. 3 is a diagram illustrating an example of a structure of data stored in the content data storage unit. For example, as illustrated in FIG. 3, the content data storage unit 21 stores content data 211 corresponding to a URL 210 representing an access destination of the content data 211. FIG. 3 illustrates an example of the content data storage unit 21 which stores the content data 211 "content 1" corresponding to the URL 210 "http://www.abcde.co.jp/xxx/".

Upon reception of a URL of content data from the user terminal 30 through the communication line 11, the distribution unit 22 extracts the content data corresponding to the received URL, from the content data storage unit 21. The distribution unit 22 sends the extracted content data to the user terminal 30 through the communication line 11.

In this embodiment, the distribution device 20 has the content data storage unit 21 which stores the content data. However, in another embodiment, this content data may be stored in another device other than the distribution device 20. In this case, the distribution device 20 has an acquisition unit which acquires content data corresponding to the URL received from the user terminal 30, from the other device. The distribution unit 22 sends the content data acquired by the acquisition unit to the user terminal 30 through the communication line 11.

Figure 4:
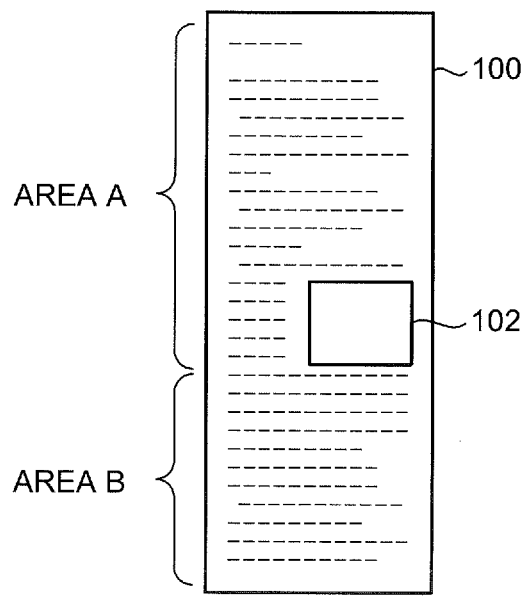
FIG. 4 is a schematic diagram illustrating an example of a structure of contents.

Descriptions will now be made to a data structure of the content 100 in this embodiment. FIG. 4 is a schematic diagram illustrating an example of a structure of content. The content 100 in this embodiment is divided into a plurality of areas (for example, an area A and an area B). The areas have voice advertisement area IDs set to represent that the areas are to be assigned with a voice advertisement, in association with each other. In this embodiment, the content 100 includes the display area 102 for playing back the video, such as a video advertisement. This display area 102 has a video advertisement area ID set to represent that it is an area for displaying a video advertisement, in association with each other. Information regarding the voice advertisement area ID and the video advertisement area ID are included in the content data. The voice advertisement area ID and the video advertisement area ID may hereinafter be referred to generally as an area ID.

The user terminal 30 wirelessly communicates with a base station 12 connected with the communication line 11, to send and receive communication data to and from the distribution device 20 and the advertisement server 40, through this base station 12 and the communication line 11. In this embodiment, the user terminal 30 is, for example, a portable PC (Personal Computer), a PDA (Personal Digital Assistant), or a smartphone, to be used by the user, and has a browser application (for example, a browser program) installed therein.

In this embodiment, a standard browser program installed in the user terminal 30 interprets and executes a control program (for example, JavaScript). In a smart device, such as the smart phone, various applications for enabling to display the Web contents may be installed, other than the program. These applications may interpret and execute the control program (for example, JavaScript), to realize functions based on the control program in the user terminal 30.

The user terminal 30 receives content data including the control program from the distribution device 20 through the base station 12 and the communication line 11, and displays the content 100 based on the received content data. The user terminal 30 acquires data regarding a voice advertisement or a video advertisement from the advertisement server 40 through the base station 12 and the communication line 11, for the respective areas of the content 100. The user terminal 30 plays back a voice advertisement or a video advertisement in the content 100, based on the received data.

Configuration of Advertisement Server 40

Figure 5:
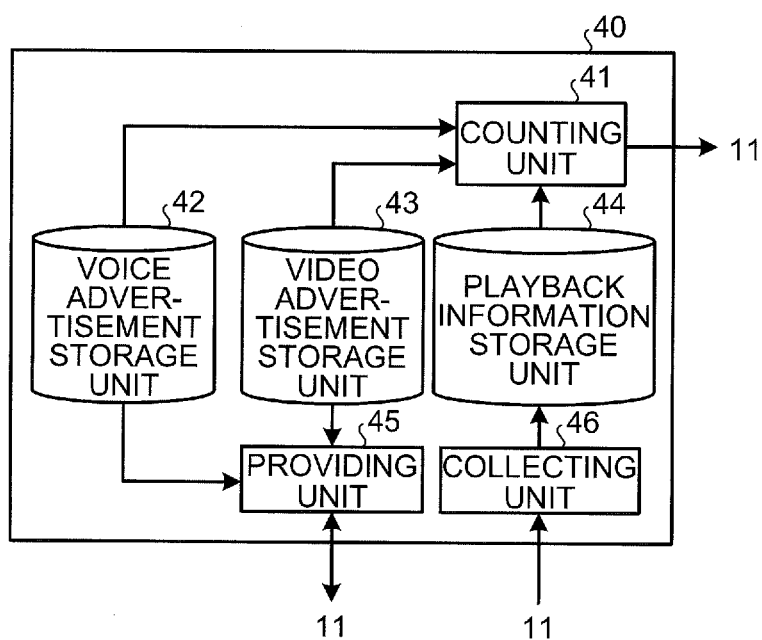
FIG. 5 is a diagram illustrating an example of a functional configuration of an advertisement server.

FIG. 5 is a diagram illustrating an example of a functional configuration of the advertisement server. The advertisement server 40 has a counting unit 41, a voice advertisement storage unit 42, a video advertisement storage unit 43, a playback information storage unit 44, a providing unit 45, and a collecting unit 46.

Figure 6:
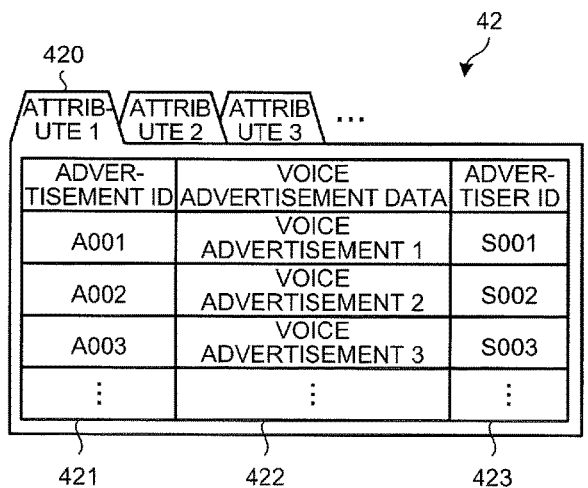
FIG. 6 is a diagram illustrating an example of a structure of data stored in a voice advertisement storage unit.

FIG. 6 is a diagram illustrating an example of a structure of data stored in the voice advertisement storage unit. As illustrated in FIG. 6, the voice advertisement storage unit 42 stores advertisement data tables in association with attribute information pieces 420 representing the user attribute of the user terminal 30. Each advertisement data table includes voice advertisement data 422 and an advertiser ID 423, corresponding to an advertisement ID 421. The attribute information may be managed in association with the advertisement ID.

The advertisement ID is information for identifying each advertisement. The attribute information includes, for example, the age, sex, and nationality of the user. Other than these, the attribute information may include information regarding specifications or performances of the user terminal 30 used by the user. The advertiser ID is information for identifying the advertiser of each advertisement.

FIG. 6 exemplifies an advertisement data table corresponding to the attribute information 420 "attribute 1". The advertisement data table exemplified in FIG. 6 includes the voice advertisement data 422 "voice advertisement 1" and the advertiser ID 423 "S001", in association with the advertisement ID 421 "A001".

Figure 7:
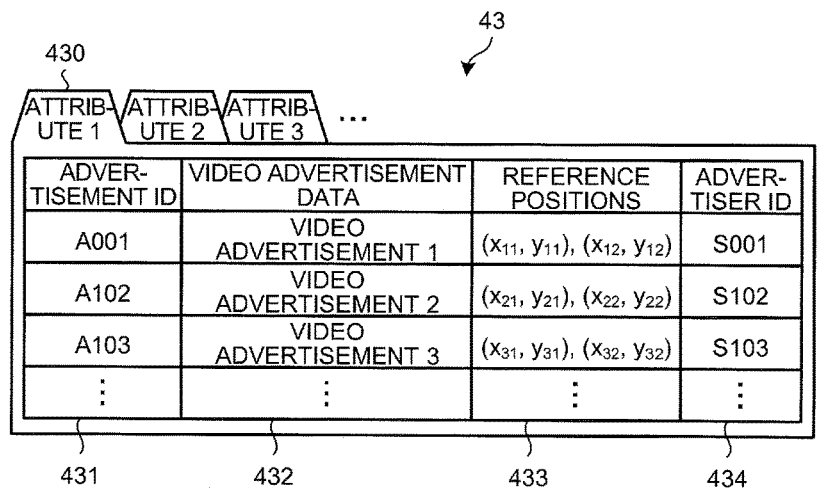
FIG. 7 is a diagram illustrating an example of a structure of data stored in a video advertisement storage unit.

FIG. 7 is a diagram illustrating an example of a structure of data stored in the video advertisement storage unit. As illustrated in FIG. 7, the video advertisement storage unit 43 stores advertisement data tables corresponding to attribute information pieces 430 representing the user attribute of the user terminal 30. Each advertisement data table stores video advertisement data 432, reference positions 433, and an advertiser ID 434, in association with the advertisement ID 431. The voice advertisement data and the video advertisement data may be hereinafter referred to generally as advertisement data.

The reference positions 433 are information items for use in determining whether to start playback of a video advertisement in the display area 102 of the content 100, and are specified with coordinates in the display area 102. The reference positions 433 will specifically be described later.

FIG. 7 exemplifies advertisement data tables corresponding to the attribute information piece 430 "attribute 1". The advertisement data table exemplified in FIG. 7 stores the video advertisement data 432 "video advertisement 1", the reference positions 433 "$(x_{11}, y_{11})$, $(x_{12}, y_{12})$", and the advertiser ID 434 "S001", in association with the advertisement ID 431 "A001".

In this embodiment, the same advertisement ID is assigned to a voice advertisement and a video advertisement related to each other to represent one advertisement. In the voice advertisement and the video advertisement related to each other to represent one advertisement, for example, the video advertisement is a video with a sound, while the voice advertisement is a sound with the corresponding video advertisement.

The voice advertisement and the video advertisement are assumed to be related to each other to represent one advertisement, in some cases. For example, in a case, the advertiser of the voice advertisement is the same as that of the video advertisement, the voice advertisement is a sound logo of the corresponding advertiser, and the video advertisement is a video regarding a product(s) or service(s) provided by the advertiser. In another case, the voice advertisement is a sound suggesting or inviting to browse the related video advertisement, for example, a sound "Get a coupon from the video advertisement below!".

When the advertiser of the voice advertisement and the advertiser of the video advertisement have a relationship of, for example, the parent company and a subsidiary, or when they have a relationship as affiliated companies, the voice advertisement and the video advertisement may be assumed to be related to each other to represent one advertisement. In addition, the voice advertisement and the video advertisement may be considered to be related to each other to represent one advertisement, when they advertise a common action or product jointly developed by a plurality of companies.

For example, as illustrated in FIG. 6 and FIG. 7, the same advertisement ID "A001" is assigned to the voice advertisement "voice advertisement 1" and the video advertisement "video advertisement 1", and this voice advertisement and this video advertisement are related to each other to represent one advertisement. In other words, the advertisement ID "A001" is assigned to the one advertisement corresponding to the voice advertisement and the video advertisement related to each other.

Figures 8, 9:
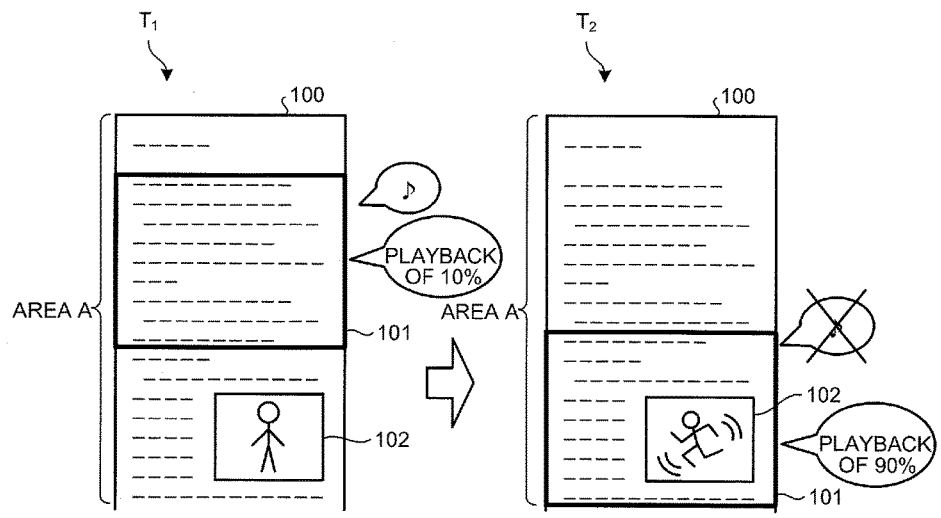
FIG. 8 is a diagram illustrating an example of a structure of data stored in a playback information storage unit.
FIG. 9 is a schematic diagram for explaining an example of a method for reporting the number of playback.

FIG. 8 is a diagram illustrating an example of a structure of data stored in the playback information storage unit. As illustrated in FIG. 8, the playback information storage unit 44 stores, for example, a number of times of playback 441 of a corresponding advertisement, in association with an advertisement ID 440. FIG. 8 exemplifies the playback information storage unit 44 which stores the number of times of playback 441 "50.1", corresponding to the advertisement ID 440 "A001". Descriptions will later be made to the intention of the numerical numbers after the decimal point stored as the number of times of playback 441.

In this embodiment, when the voice advertisement or the video advertisement is played back, the user terminal 30 sends playback information representing the number of times of playback together with identification information regarding the played back a voice advertisement or a video advertisement, to the advertisement server 40 through the communication line 11. The advertisement server 40 counts the number of times of playback in association with each identification information item of the advertisement, and sends a counted result to a charge processing server through the communication line 11.

For the voice advertisement and the video advertisement related to each other to represent one advertisement, when either one advertisement is played back, the user terminal 30 sends playback information representing that this one advertisement has been played back at a predetermined rate, to the advertisement server 40. This point will specifically be described using FIG. 9.

FIG. 9 is a schematic diagram for explaining an example of a method for reporting the number of times of playback. In the example of FIG. 9, it is assumed that the voice advertisement played back in the area A of the content 100 and the video advertisement played back in the display area 102 are related to each other to represent one advertisement. For example, at the time $T_1$ of FIG. 9, when the voice advertisement in the area A is played back, the user terminal 30 sends playback information representing that the one advertisement has been played back at a first rate (of, for example, 10%), to the advertisement server 40. When the playback has been performed at a rate of 10%, playback information representing the playback of 0.1 time is sent to the advertisement server 40.

For example, at the time $T_2$ of FIG. 9, when the video advertisement is played back in the display area 102, the user terminal 30 sends playback information representing that the corresponding one advertisement has been played back at a second rate (of, for example, 90%), to the advertisement server 40. When the playback has been performed at a rate of 90%, playback information representing the playback of 0.9 time is sent to the advertisement server 40.

Upon playback of both of the voice advertisement and the video advertisement related to each other to represent one advertisement, the user terminal 30 informs the advertisement server 40 that both of the advertisements have been played back one time. In this manner, the voice advertisement and the video advertisement are related to each other, in association with the number of times of playback. As a result, it is possible to realize a flexible charging method for charging for playing back the advertisements at a predetermined playback rate or greater. That is, different charges are made, in accordance with the number of times of playback of the voice advertisement and the number of times of playback of the video advertisement.

Of the voice advertisement and the video advertisement related to each other to represent one advertisement, when either one advertisement is not played back, as illustrated in FIG. 8, for example, the counted result regarding the number of times of playback includes numerical numbers after the decimal point.

Descriptions will continuously be made, back to FIG. 5. The providing unit 45 receives an advertisement request having user attribute information and one or more area IDs, from the user terminal 30 through the communication line 11. The providing unit 45 selects the area ID included in the received advertisement request one at a time, and refers to the voice advertisement storage unit 42, if the selected area ID is a voice advertisement area ID.

The providing unit 45 extracts an advertisement ID and voice advertisement data corresponding to this advertisement ID, from an advertisement data table corresponding to the attribute information included in the advertisement request. The providing unit 45 may randomly extract the advertisement ID and the voice advertisement data from the advertisement data table, or may extract them sequentially in a predetermined order. The providing unit 45 keeps the extracted advertisement ID and the voice advertisement data, in association with the voice advertisement area ID.

Of remaining area ID(s) included in the advertisement request, if there exists a video advertisement area ID, the providing unit 45 refers to the video advertisement storage unit 43. If there exists the same advertisement ID as the advertisement ID kept in association with the voice advertisement area ID, in the video advertisement storage unit 43, the providing unit 45 extracts the video advertisement data and the reference positions corresponding to the advertisement ID (that is, the video advertisement data related to the previously extracted voice advertisement data) from the video advertisement storage unit 43, together with the advertisement ID. The providing unit 45 keeps the extracted advertisement ID, the video advertisement data, and the reference positions, in association with the video advertisement area ID.

If the area ID selected from the area IDs included in the advertisement request is a video advertisement area ID, the providing unit 45 refers to the video advertisement storage unit 43. The providing unit 45 extracts an advertisement ID, and the video advertisement data and the reference positions corresponding to this advertisement ID, from the advertisement data table corresponding to the attribute information included in the advertisement request. The providing unit 45 keeps the extracted advertisement ID, the video advertisement data, and the reference positions, in association with the video advertisement area ID.

When there exists the voice advertisement area ID in the remaining area ID(s) included in the advertisement request, the providing unit 45 refers to the voice advertisement storage unit 42. If there exists the same advertisement ID as the advertisement ID kept in association with the video advertisement area ID in the voice advertisement storage unit 42, the providing unit 45 extracts the voice advertisement data corresponding to the advertisement ID together with the corresponding advertisement ID from the voice advertisement storage unit 42. The providing unit 45 keeps the extracted advertisement ID and the voice advertisement data, in association with the voice advertisement area ID.

In this manner, the providing unit 45 relates the advertisement data item to the area ID in one-to-one correspondence to each other, and when there are related advertisement data items, the unit preferentially relates the data items to another area ID(s). The providing unit 45 sends the advertisement ID, the advertisement data, and the reference positions (if the area ID is a video advertisement area ID) to the user terminal 30 through the communication line 11, for the respective area IDs included in the advertisement request.

When the collecting unit 46 receives playback information including the advertisement ID and the number of times of playback from the user terminal 30 through the communication line 11, the collecting unit specifies the number of times of playback corresponding to the advertisement ID included in this playback information in the playback information storage unit 44. The collecting unit 46 adds the number of times of playback included in the received playback information, to the specified number of times of playback.

The counting unit 41 refers to the playback information storage unit 44 at predetermined timings, and acquires the number of times of playback, in association with each advertisement ID. The counting unit 41 refers to the voice advertisement storage unit 42 and the video advertisement storage unit 43, and specifies an advertiser ID corresponding to the advertisement ID. The counting unit 41 sends the advertisement ID and the number of times of playback in association with each advertiser ID to an external charge processing server (not illustrated) through the communication line 11, to execute a charge process. Then, the counting unit 41 resets all the numbers of times of playback in the playback information storage unit 44, to "0".

Configuration of User Terminal 30

Figure 10:
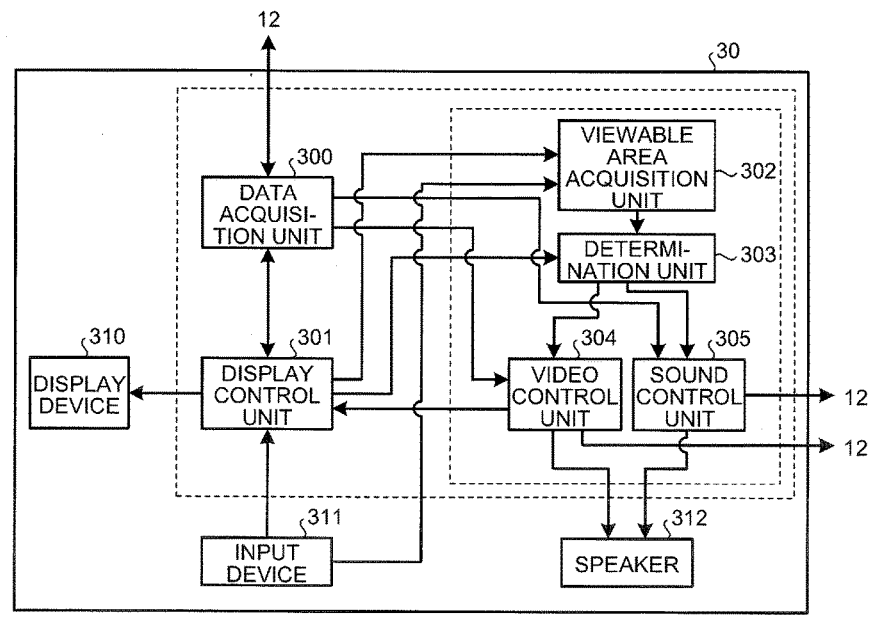
FIG. 10 is a block diagram illustrating an example of a functional configuration of a user terminal in the first embodiment.

FIG. 10 is a block diagram illustrating an example of a functional configuration of the user terminal in the first embodiment. The user terminal 30 of this embodiment has a data acquisition unit 300, a display control unit 301, a viewable area acquisition unit 302, a determination unit 303, a video control unit 304, a sound control unit 305, a display device 310, an input device 311, and a speaker 312.

Of those functions of the user terminal 30, the data acquisition unit 300, the display control unit 301, the viewable area acquisition unit 302, the determination unit 303, the video control unit 304, and the sound control unit 305 are realized by a browser program executed by a calculation device in the user terminal 30.

Specifically, the viewable area acquisition unit 302, the determination unit 303, the video control unit 304, and the sound control unit 305 are realized by executing a control program included in the content data distributed from the distribution device 20, under the control of the browser program.

The data acquisition unit 300 sends a URL of content data to the distribution device 20 through the communication line 11, thereby acquiring the content data from the distribution device 20 through the communication line 11. The data acquisition unit 300 analyzes the acquired content data, and extracts an area ID of an area for playing back a voice advertisement as an area included in the content 100 to be created and an area ID of the display area 102 for playing back the video advertisement.

The data acquisition unit 300 sends an advertisement request including attribute information of a user of the distribution system 10 and the extracted area IDs to the advertisement server 40 through the communication line 11. The attribute information of the user may include an HTTP cookie (HyperText Transfer Protocol Cookie) stored in the user terminal 30.

The data acquisition unit 300 receives an advertisement ID and advertisement data in association with each area ID, from the advertisement server 40 through the communication line 11. When the area ID is a video advertisement area ID, the data acquisition unit 300 receives information regarding the advertisement ID, the advertisement data, and the reference positions, in association with each area ID from the advertisement server 40. The data acquisition unit 300 sends the information regarding the reference positions of each area ID together with the content data to the display control unit 301.

The data acquisition unit 300 compares the advertisement IDs sent from the advertisement server 40, in association with the area IDs. When the same advertisement IDs exist, the data acquisition unit 300 sets related information representing that there exists another related advertisement data item to be related to the same advertisement ID. If the area ID is a video advertisement area ID, the data acquisition unit 300 sends this area ID, the advertisement ID, and the video advertisement data to the video control unit 304. At this time, if the related information is related to the advertisement ID, the data acquisition unit 300 also sends this related information to the video control unit 304.

If the area ID is a voice advertisement area ID, the data acquisition unit 300 sends this area ID, the advertisement ID, and the voice advertisement data to the sound control unit 305. At this time, if the related information is related to the advertisement ID, the data acquisition unit 300 also sends this related information to the sound control unit 305.

The display control unit 301 constructs the content 100 based on the content data received from the data acquisition unit 300. The display control unit 301 sends position information of an area(s) for playing back the voice advertisement and the area IDs corresponding to the respective areas in the content 100, to the determination unit 303. The position information regarding the respective areas is displayed in the form of coordinates in, for example, the content 100, and includes information regarding the position and size in the content 100.

The display control unit 301 sends the area ID of the display area 102 for the video advertisement and information regarding the reference positions of this display area 102 to the determination unit 303. Information items regarding the reference positions of the display area 102 are managed as coordinates in the display area 102, in the advertisement server 40. Thus, the display control unit 301 converts them into, for example, coordinates in the content 100, and sends them to the determination unit 303.

The display control unit 301 specifies a viewable area in the content 100, in response to a user operation received through the input device 311, such as a touch panel. The display control unit 301 sends image data of the content 100 which is included in the specified viewable area, to the display device 310. Upon reception of the frame data of the played back a video advertisement from the video control unit 304 together with the area ID, the display control unit 301 maps an image of the received frame data into the display area 102 corresponding to the received area ID, and sends the image to the display device 310. The display device 310 is, for example, a liquid crystal panel, and displays images based on data received from the display control unit 301.

Figure 11:
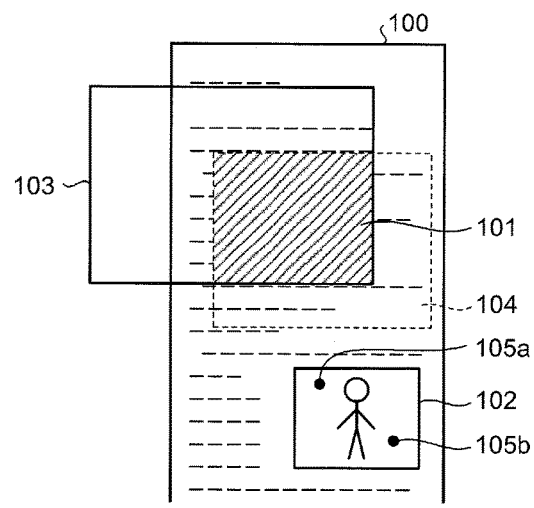
FIG. 11 is a schematic diagram for explaining an example of a viewable area.

Descriptions will now be made to the viewable areas. FIG. 11 is a schematic diagram for explaining an example of a viewable area. In this embodiment, as illustrated in FIG. 11, the viewable area 101 is included in a display area 104 of the browser in the area of the content 100, and included in a display area 103 of the screen of the user terminal 30. Moreover, for example, of the areas of the content 100, the area included in the display area 104 of the browser may be assumed as a viewable area.

The display control unit 301 acquires the position information representing the position and size of the viewable area from an OS (Operating System) or the like executed on, for example, the user terminal 30. The display control unit 301 converts the position information of the viewable area into, for example, coordinates in the content 100, and manages the coordinates. In the example of FIG. 11, the shaded area is the viewable area 101.

Upon detection of a user operation through the input device 311, such as a touch panel or hardware switch, the viewable area acquisition unit 302 acquires position information of the viewable area from the display control unit 301. The viewable area acquisition unit 302 sends the acquired position information of the viewable area to the determination unit 303.

The determination unit 303 determines whether the display area 102 is included in the viewable area, using the position information of the viewable area and the reference positions corresponding to the display area 102 of the video advertisement, based on, for example, the coordinates in the content 100. In this embodiment, when the entire reference positions corresponding to the display area 102 are included in the viewable area, the determination unit 303 determines that the display area 102 is included in the viewable area.

Figure 12A:
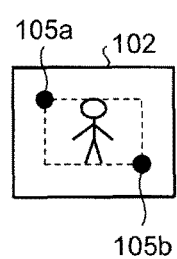
FIGS. 12A to 12C are schematic diagrams for explaining examples of reference positions.
Figure 12B:
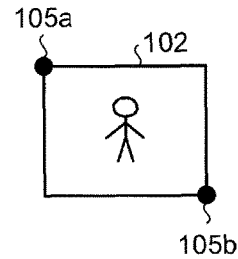
Figure 12C:
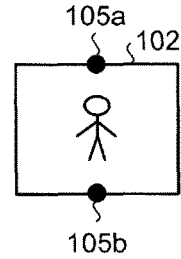

In this embodiment, in the video advertisement, plurality of reference positions corresponding to the display area 102. FIGS. 12A to 12C are schematic diagrams for explaining an example of reference positions. As illustrated in, for example, FIG. 12A, two reference positions are provided in the display area 102, in this embodiment. Both two reference positions 105a and 105b have different vertical and horizontal coordinates in the display area 102.

Accordingly, the two reference positions having different vertical and horizontal coordinates are provided in the display area 102. As a result, even if the content 100 is scrolled in any direction, when a rectangular area having the two reference positions as the opposite angles is included in the viewable area, the determination unit 303 determines that the display area 102 is included in the viewable area.

At the stage that the rectangular area having the two reference positions as opposite angles is included in the viewable area, if the video advertisement is played back in this display area 102, the user terminal 30 can attract the attention of the user earlier to the video advertisement, than the case where the display area 102 is entirely included in the viewable area. As a result, it is possible to enhance the chance for the user to scroll the content 100, in a manner that the display area 102 is entirely displayed in the viewable area. The distribution device 20 can increase the opportunity for the user to watch the video advertisement in the display area 102.

If the two reference positions are arranged in a manner that the area for displaying a characteristic image in the video advertisement is surrounded with a rectangle having the two reference positions as opposite angles, the user terminal 30 can start playback of the video advertisement at the stage where the area for displaying the characteristic image in the display area 102 is included in the viewable area. Consequently, the distribution device 20 can further increase the opportunity to attract the attention of the user to the video advertisement. In many cases, the advertiser or creator of the video advertisement recognizes the area for displaying the characteristic image in the video advertisement. Thus, it is preferred that the two reference positions be registered in the video advertisement storage unit 43 in the advertisement server 40 by the advertiser of the corresponding video advertisement data, together with the video advertisement data.

Depending on the contents of the video advertisement, if the video is entirely shown, it may be likely to attract the attention of the user. In this case, as illustrated in FIG. 12B, the two opposite angles of the display area 102 are assumed as the reference positions, thus enabling to start playback of the video, when the display area 102 is entirely included in the viewable area. In this case also, the distribution device 20 can start playback of the video advertisement, when the display area 102 is entirely included in the viewable area, even if the content 100 is scrolled in any direction.

As illustrated in FIG. 12C, for the content 100 in which the scroll direction is set in the perpendicular direction to the display area 102, the reference positions may be provided on the sides opposed perpendicular to the frame of the display area 102. In this case, the distribution device 20 may start playback of the video advertisement, when the display area 102 is entirely included in the viewable area, in the scroll in the perpendicular direction. For the content 100 in which the scroll direction is set in the crosswise direction, the reference positions may be provided on the sides opposed crosswise to the frame of the display area 102.

In one video advertisement, three or more reference positions for the display area 102 may be provided. When the number of the reference positions is three or more, the determination unit 303 may determine that the display area 102 is included in the viewable area, when two or more reference positions are included in the viewable area, other than when the reference positions are entirely included in the viewable area. In one video advertisement, one reference position for the display area 102 may be provided.

Descriptions will continuously be made, back to FIG. 10. The determination unit 303 instructs the video control unit 304 to stop playback of the video advertisement, using the position of the viewable area and the reference positions of the display area 102, when it is determined that the display area 102 is not included in the viewable area.

The determination unit 303 specifies the area in the content 100 included in the viewable area. When the viewable area crosses over two areas in the content 100, the determination unit 303 specifies a larger area in the viewable area, as an area included in the viewable area. The determination unit 303 then sends an area ID corresponding to the specified area to the sound control unit 305.

When it is determined that the display area 102 is included in the viewable area, the determination unit 303 instructs the sound control unit 305 to stop playback of the voice advertisement. The determination unit 303 then sends an area ID corresponding to this display area 102 to the video control unit 304.

The video control unit 304 receives and keeps an advertisement ID, video advertisement data, and related information, in association with each area ID, from the display control unit 301. Upon reception of the area ID from the determination unit 303, the video control unit 304 starts playback of video advertisement data corresponding to the received area ID.

For example, the video control unit 304 decodes the video advertisement data, and sends frame data to the display control unit 301 together with the area ID, thereby starting playback of the video advertisement. When the video advertisement is a video with a sound, the video control unit 304 also decodes this sound, and outputs the decoded sound through the speaker 312.

When the playback of the video advertisement data has been completed, the video control unit 304 determines whether the related information has been received from the display control unit 301 together with the video advertisement data. When the related information has not been received together with this video advertisement data, the video control unit 304 sends playback information including an advertisement ID corresponding to the video advertisement data and the number of times of playback representing that this video advertisement data has been played back once, to the advertisement server 40 through the communication line 11.

When the related information has been received together with played back video advertisement data, the video control unit 304 sends playback information including an advertisement ID corresponding to the video advertisement data and the number of times of playback representing that the advertisement related to the video advertisement data has been played back at a second rate (of, for example, 0.9 time), to the advertisement server 40 through the communication line 11.

In response to an instruction for stopping the playback of the video advertisement from the determination unit 303, if the playback of the video advertisement has not been completed, the video control unit 304 stops decoding the video advertisement, thereby stopping the playback of the video advertisement. When the video advertisement is a video with a sound, the video control unit 304 stops decoding this sound.

The sound control unit 305 receives the advertisement ID, the voice advertisement data, and the related information, in association with the area ID, from the display control unit 301, and keeps them. Upon reception of the area ID from the determination unit 303, the sound control unit 305 starts playback of voice advertisement data corresponding to the received area ID. For example, the sound control unit 305 decodes the voice advertisement data, and outputs the decoded sound through the speaker 312, thereby starting playback of the voice advertisement.

When the playback of the voice advertisement data has been completed, the sound control unit 305 determines whether the related information has been received together with the corresponding voice advertisement data from the display control unit 301. When the related information has not been received together with the corresponding voice advertisement data, the sound control unit 305 sends playback information including an advertisement ID corresponding to this voice advertisement data and the number of times of playback representing that this voice advertisement data has been played back once, to the advertisement server 40 through the communication line 11.

When the related information has been received together with the completely played back voice advertisement data, the sound control unit 305 sends playback information including an advertisement ID corresponding to this voice advertisement data and the number of times of playback representing that the advertisement related to the voice advertisement data has been played back at a first rate (of, for example, 0.1 time) to the advertisement server 40 through the communication line 11.

In response to an instruction for stopping the playback of the voice advertisement from the determination unit 303, if the playback of the voice advertisement has not been completed, the sound control unit 305 stops decoding the voice advertisement, thereby stopping the playback of the voice advertisement.

[Operation of User Terminal 30]

FIG. 13 is a flowchart illustrating an example of an operation of the user terminal in the first embodiment. The user terminal 30 acquires content data from the distribution device 20, and reads a control program included in the acquired content data, thereby starting the operation illustrated in this flowchart.

The viewable area acquisition unit 302 acquires the position information of the viewable area from the display control unit 301, and sends the position information to the determination unit 303. The determination unit 303 determines whether the display area 102 is included in the viewable area, using the position information of the viewable area and the reference positions corresponding to the display area 102 of the video advertisement, based on, for example, the coordinates in the content 100 (Step S100). When the display area 102 is not included in the viewable area (Step S100: No), the determination unit 303 executes the procedure of Step S114, as will be described later.

When the viewable area is included in the display area 102 (Step S100: Yes), the determination unit 303 sends an area ID corresponding to the display area 102 included in the viewable area to the video control unit 304. The video control unit 304 starts playback of the video advertisement data corresponding to the area ID received from the determination unit 303 (Step S102). At this time, when the video advertisement has been played back halfway through, the video control unit 304 may continuously play back the video advertisement from the halfway point, or may play back the video advertisement from the beginning.

The viewable area acquisition unit 302 determines whether a user operation through the input device 311 has been detected (Step S104). When the user operation has not been detected (Step S104: No), the video control unit 304 determines whether the playback of the video advertisement data has been completed (Step S106). When the playback of the video advertisement data has not been completed (Step S106: No), the viewable area acquisition unit 302 executes the procedure of Step S104 again.

When the playback of the video advertisement data has been completed (Step S106: Yes), the video control unit 304 sends playback information including the advertisement ID of the completely played back video advertisement data and the number of times of playback to the advertisement server 40 through the communication line 11 (Step S108). Then, the viewable area acquisition unit 302 executes the procedure of Step S104 again. In Step S108, the video control unit 304 obtains the number of times of playback as "once", if related information does not correspond to the advertisement ID of the completely played back video advertisement data, and obtains the number of times of playback as "the number of times at a second rate" (for example, 0.9 time), if the related information corresponds thereto.

When the user operation has been detected (Step S104: Yes), the viewable area acquisition unit 302 acquires the position information of the viewable area from the display control unit 301, and sends the position information to the determination unit 303. The determination unit 303 determines whether the display area 102 is included in the viewable area, using the position information of the viewable area and the reference positions corresponding to the display area 102 of the video advertisement (Step S110).

When the display area 102 is included in the viewable area (Step S110: Yes), the viewable area acquisition unit 302 executes the procedure of Step S104 again. When the display area 102 is not included in the viewable area (Step S110: No), the determination unit 303 instructs the video control unit 304 to stop playback of the video advertisement. The video control unit 304 stops the playback of the video advertisement, if the video advertisement is played back (Step S112).

The determination unit 303 specifies an area in the content 100 included in the viewable area, and sends an area ID corresponding to the specified area to the sound control unit 305. The sound control unit 305 starts playback of the voice advertisement data corresponding to the area ID received from the determination unit 303 (Step S114).

The viewable area acquisition unit 302 determines whether the user operation through the input device 311 has been detected (Step S116). When the user operation has not been detected (Step S116: No), the sound control unit 305 determines whether the playback of the voice advertisement data has been completed (Step S118). When the playback of the voice advertisement data has not been completed (Step S118: No), the viewable area acquisition unit 302 executes the procedure of Step S116 again.

When the playback of the voice advertisement data has been completed (Step S118: Yes), the sound control unit 305 sends playback information including an advertisement ID of the completely played back voice advertisement data and the number of times of playback to the advertisement server 40 through the communication line 11 (Step S120). The viewable area acquisition unit 302 executes the procedure of Step S116 again. In Step S120, the sound control unit 305 obtains the number of times of playback as "once", if the related information does not correspond to the advertisement ID of the completely played back voice advertisement data, and obtains the number of times of playback as "the number of times at a first rate" (for example, 0.1 time), if the related information corresponds thereto.

When the user operation has been detected (Step S116: Yes), the viewable area acquisition unit 302 acquires the position information of the viewable area from the display control unit 301, and sends the position information to the determination unit 303. The determination unit 303 determines whether the display area 102 is included in the viewable area, using the position information of the viewable area and the reference positions corresponding to the display area 102 of the video advertisement (Step S122).

When the display area 102 is included in the viewable area (Step S122: Yes), the determination unit 303 instructs the sound control unit 305 to stop playback of the voice advertisement. If the voice advertisement is played back, the sound control unit 305 stops the playback of the voice advertisement (Step S126). The determination unit 303 and the video control unit 304 execute the procedure of Step S102 again.

When the display area 102 is not included in the viewable area (Step S122: No), the determination unit 303 determines whether another area with the acquired voice advertisement is included in the viewable area (Step S124). When another area is included in the viewable area (Step S124: Yes), the determination unit 303 and the sound control unit 305 execute the procedure of Step S114. When another area with the acquired voice advertisement is not included in the viewable area (Step S124: No), the viewable area acquisition unit 302 executes the procedure of Step S116 again.

Accordingly, the first embodiment has been described.

As obvious from the above descriptions, the distribution system 10 of this embodiment causes the user terminal 30 to play back the sound of the voice advertisement, even if the video display area of the video advertisement is not displayed on the screen of the user terminal 30. Therefore, it is possible to provide much information to the user of the user terminal 30.

Second Embodiment

Descriptions will now be made to a second embodiment with reference to the drawings.

Scheme of Process

Figure 14:
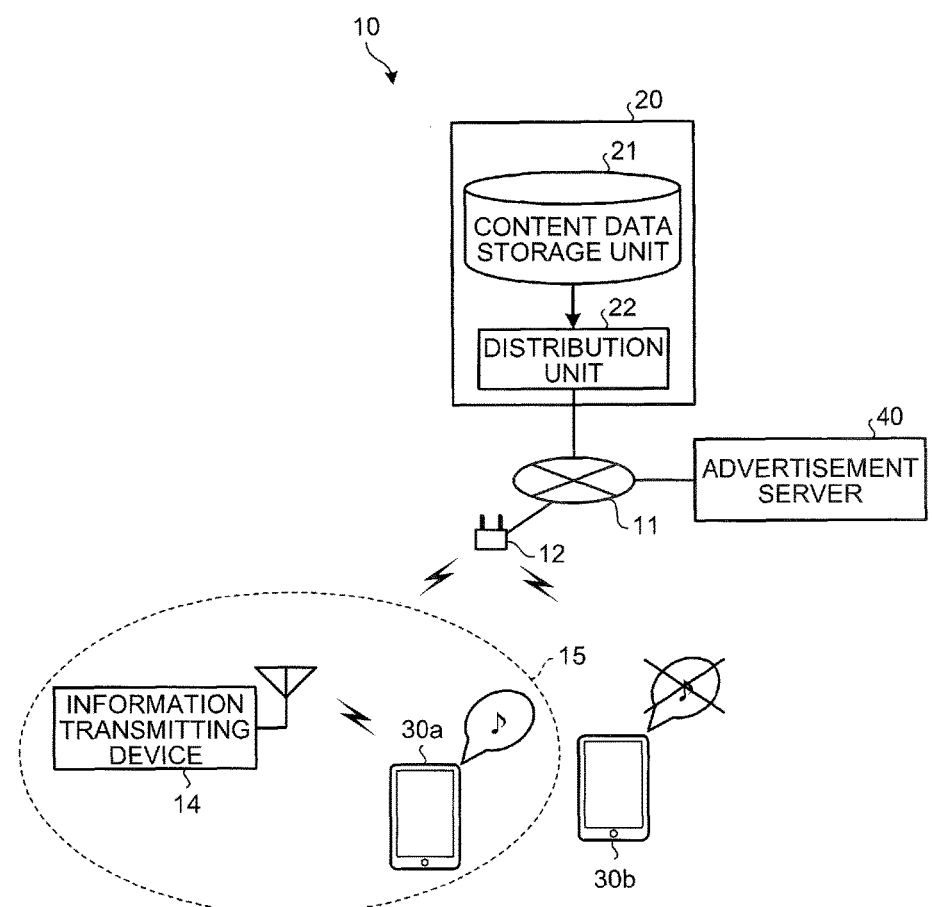
FIG. 14 is a system configuration diagram illustrating an example of a distribution system in a second embodiment.

FIG. 14 is a system configuration diagram of one example of a distribution system in the second embodiment. The distribution system 10 in this embodiment includes a distribution device 20, a user terminal 30, an advertisement server 40, and an information transmitting device 14. Except those points as will be described below, in FIG. 14, the constituent elements with the same reference numerals as those of FIG. 2 have the same or similar functions as those of FIG. 2, thus will not be described again.

In this embodiment, the information transmitting device 14 is provided in facilities (shopping mall or night club) where the sound output of the advertisement is allowed. The information transmitting device 14 wirelessly sends a signal representing that the sound output is allowed.

The user terminal 30 outputs a sound of a voice advertisement or a video advertisement, when the user terminal is in a position (for example, a position of a user terminal 30a illustrated in FIG. 14) in a range 15 within which a wirelessly transmitted signal from the information transmitting device 14 can be received at a predetermined reception strength or higher. This predetermined reception strength implies a certain level of reception strength at which information (for example, a preset code) representing that the sound output is allowed can be decoded, from the received signal. The user terminal 30 stops the sound output of the voice advertisement or the video advertisement, when the user terminal is in a position (for example, position of a user terminal 30b illustrated in FIG. 14) outside the range 15.

When the user terminal is moved into a facility where the sound output is not allowed, the user performs some setting for the sound output of the user terminal 30, thereby enabling to stop the sound output of the user terminal 30. However, this involves some troublesome work for the user.

When the user moves into a facility where the sound output is not allowed without setting to stop the sound output, the user terminal 30 outputs the sound of the voice advertisement or the video advertisement, thus causing a nuisance to others. To avoid this situation, the user may always set the sound output to be not available. This misses an opportunity to appeal a product or service to the user using the voice advertisement. Even in the video advertisement, the contents of the video advertisement may not be provided to the user, due to the unavailable sound output.

When the user terminal 30 of this embodiment is moved to a facility where the sound output is allowed, the sound output of the voice advertisement and the video advertisement becomes automatically available. In other places, the sound output is controlled in accordance with the user setting. As a result, the user terminal 30 can cause more opportunities to let the user listen to the sound of the voice advertisement, in facilities where the sound output is allowed. Even in the video advertisement, the user terminal 30 can provide the user with the contents of the video advertisement by performing the sound output in facilities where the sound output is allowed.

Configuration of User Terminal 30

Figure 15:
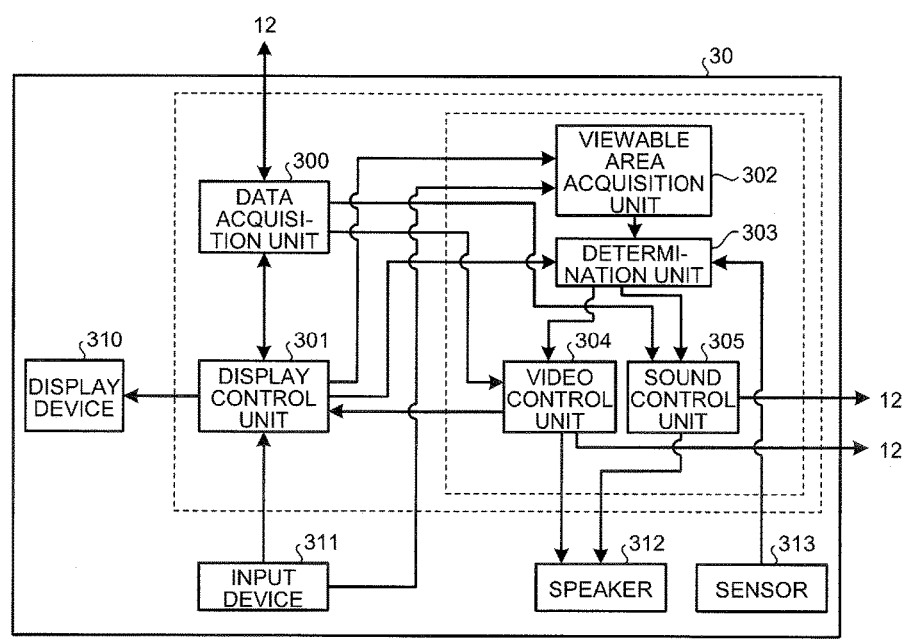
FIG. 15 is a block diagram illustrating an example of a functional configuration of a user terminal in the second embodiment.

FIG. 15 is a block diagram illustrating an example of a functional configuration of the user terminal in the second embodiment. The user terminal 30 in this embodiment has a data acquisition unit 300, a display control unit 301, a viewable area acquisition unit 302, a determination unit 303, a video control unit 304, a sound control unit 305, a display device 310, an input device 311, a speaker 312, and a sensor 313. Except those points as will be described below, in FIG. 15, the constituent elements with the same reference numerals as those of FIG. 10 have the same or similar functions as those of FIG. 10, thus will not be described again.

The sensor 313 receives a signal sent from the information transmitting device 14, and decodes the received signal, using a short-distance wireless communication system, such as a wireless LAN, Bluetooth (registered trademark) or Zigbee (registered trademark). The sensor 313 tries to decode the signal from the information transmitting device 14 at predetermined timings (for example, at every one second). The sensor 313 informs the determination unit 303 of information representing whether the information regarding the allowance of the sound output has successfully been decoded, at predetermined timings.

Upon determination that the display area 102 is included in a viewable area, the determination unit 303 determines whether the information received immediately before from the sensor 313 represents that the information regarding the allowance of the sound output has successfully been decoded. When the information received immediately before from the sensor 313 represents that the information regarding the allowance of the sound output has successfully been decoded, that is, when the sound output is allowed, the determination unit 303 instructs the sound control unit 305 to stop the playback of the voice advertisement. Then, the determination unit 303 sends an area ID corresponding to the display area 102 included in the viewable area to the video control unit 304.

When the information received immediately before from the sensor 313 represents that the information regarding the allowance of the sound output has not successfully been decoded, that is, when the sound output is not allowed, the determination unit 303 instructs the sound control unit 305 to stop the playback of the voice advertisement. The determination unit 303 sends an instruction not to output the sound and an area ID corresponding to the display area 102 included in the viewable area to the video control unit 304.

Upon determination that the display area 102 is not included in the viewable area, the determination unit 303 determines whether the sound output is allowed, based on the information received immediately before from the sensor 313. When the sound output is allowed, the determination unit 303 instructs the video control unit 304 to stop the playback of the video advertisement. Then, the determination unit 303 specifies an area in the content 100 included in the viewable area, and sends an area ID corresponding to the specified area to the sound control unit 305.

When the sound output is not allowed, the determination unit 303 instructs the video control unit 304 to stop the playback of the video advertisement, and does not send the area ID to the sound control unit 305. This results in not playing back the voice advertisement corresponding to the area in the content 100 included in the viewable area.

Upon reception of an area ID from the determination unit 303, the video control unit 304 starts playback of the video advertisement data corresponding to the received area ID. When the video advertisement has a sound, if an instruction not to output the sound is not received from the determination unit 303, the video control unit 304 decodes this sound, and outputs the decoded sound through the speaker 312. If an instruction not to output the sound is received from the determination unit 303, the video control unit 304 does not output the sound, and plays back the video, even if the video advertisement has a sound.

When a headphone is connected to the user terminal 30, the video control unit 304 and the sound control unit 305 may output the sound to the headphone, regardless of information from the sensor 313.

Operation of User Terminal 30

Figure 16:
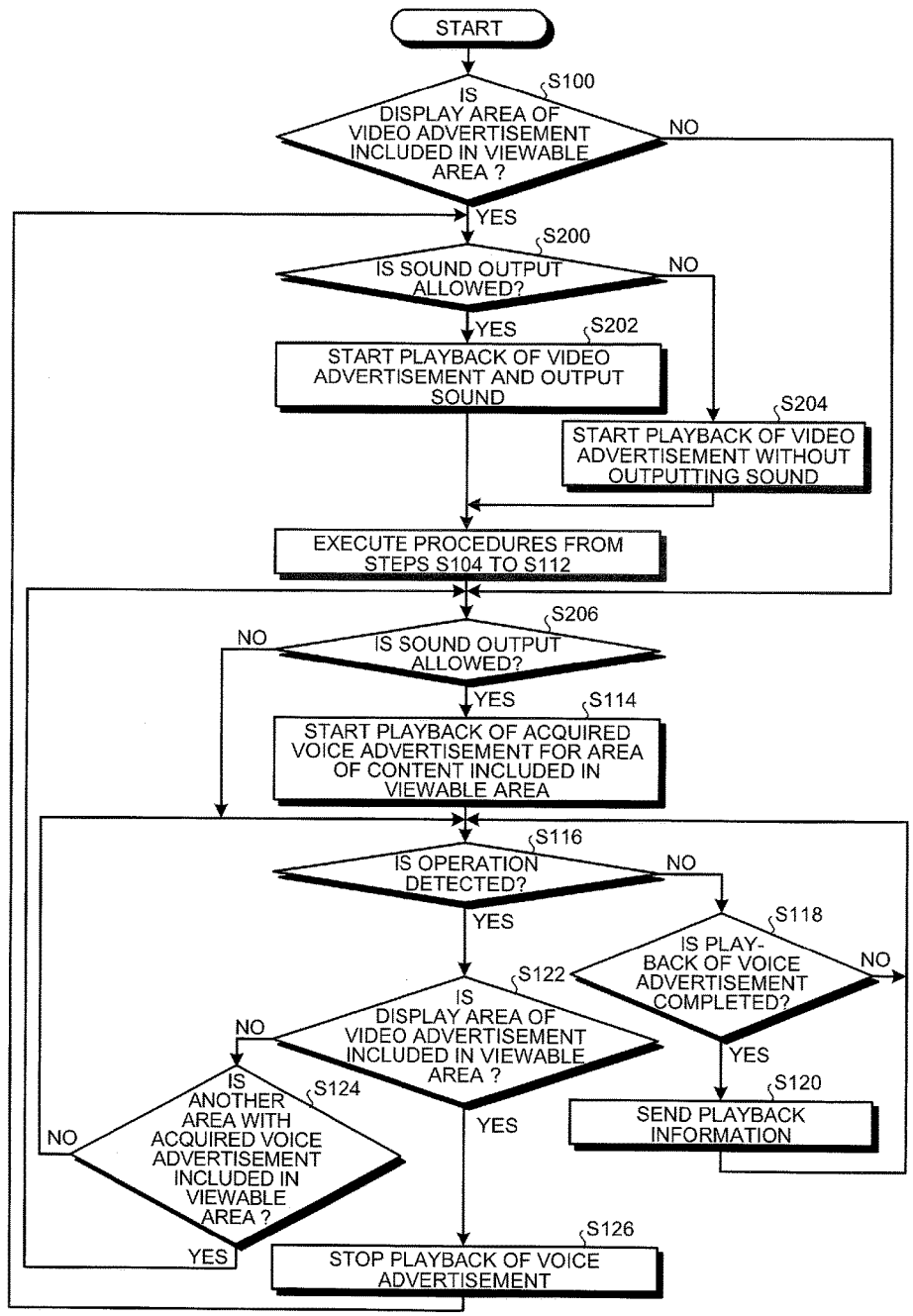
FIG. 16 is a flowchart illustrating an example of an operation of the user terminal in the second embodiment.

FIG. 16 is a flowchart illustrating an example of an operation of the user terminal in the second embodiment. The user terminal 30 acquires content data from the distribution device 20, and reads a control program included in the acquired content data, thereby starting the operation illustrated in this flowchart. Except those points as will be described below, in FIG. 16, the procedures with the same reference numerals as those of FIG. 13 are the same or similar procedures as those of FIG. 13, thus will not be described again.

In Step S100, when the display area 102 is included in the viewable area (Step S100: Yes), the determination unit 303 refers to the information so far received from the sensor 313, to determine whether the sound output is allowed (Step S200). When the sound output is allowed (Step S200: Yes), the determination unit 303 sends an area ID corresponding to the display area 102 included in the viewable area to the video control unit 304.

The video control unit 304 starts playback of the video advertisement data corresponding to the received area ID. When the video advertisement has a sound, the video control unit 304 decodes the sound, and outputs the decoded sound through the speaker 312 (Step S202).

When the sound output is not allowed (Step S200: No), the determination unit 303 sends an instruction not to output the sound and the area ID corresponding to the display area 102 included in the viewable area to the video control unit 304. The video control unit 304 starts playback of the video advertisement data corresponding to the received area ID. At this time, even if the video advertisement has a sound, the video control unit 304 does not output the sound, and plays back the video (Step S204).

After execution of the procedure of Step S112, the determination unit 303 refers to the information so far received from the sensor 313, to determine whether the sound output is allowed (Step S206). When the sound output is allowed (Step S206: Yes), the determination unit 303 specifies an area in the content 100 included in the viewable area, and sends an area ID corresponding to the specified area to the sound control unit 305. The sound control unit 305 starts playback of the voice advertisement data corresponding to the area ID received from the determination unit 303.

When the sound output is not allowed (Step S206: No), the viewable area acquisition unit 302 executes the procedure of Step S116. In this case, the voice advertisement is not played back by the sound control unit 305.

Accordingly, the second embodiment has been described.

As obvious from the above descriptions, the distribution system 10 of this embodiment can increase the opportunity for the user to listen to the sound of the voice advertisement, in the facilities where the sound output is allowed. In the video advertisement, the distribution system 10 outputs the sound in the facilities where the sound output is allowed, thereby enabling to inform the user of the contents of the video advertisement.

Third Embodiment

Descriptions will now be made to a third embodiment with reference to the drawings.

Scheme of Process

Figure 17:
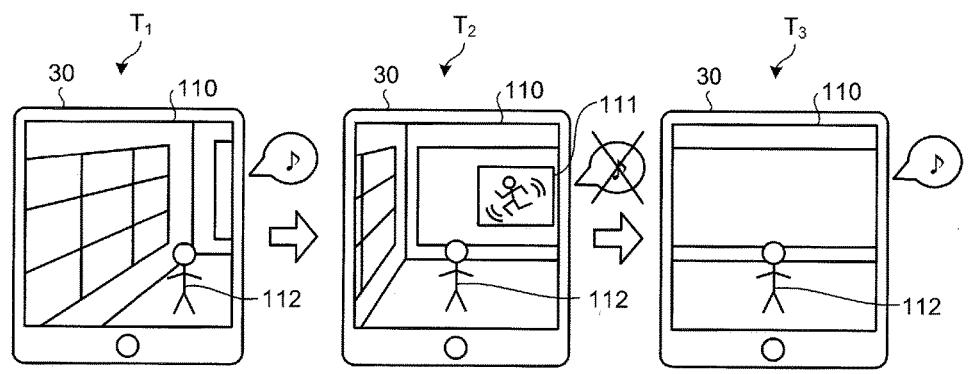
FIG. 17 is a schematic diagram for explaining a schematic example of a process in a third embodiment.

FIG. 17 is a schematic diagram for explaining a schematic example of a process in the third embodiment. A user terminal 30 in this embodiment executes a program, such as a game, distributed from a distribution device 20, and displays content 110 showing a three-dimensional space realized by this program on a screen of the user terminal 30, in response to a user operation.

The user can move a player 112 of a game or the like in the three-dimensional space, by operating the user terminal 30. The user terminal 30 specifies a visual point position and visual line direction of the user in the three-dimensional space, in accordance with a user operation, and creates a two-dimensional image, when the three dimensional space in the visual line direction of the user is viewed from the specified visual point position of the user. Then, the user terminal 30 specifies an area to be displayed on the screen of the user terminal 30 as a viewable area, in the created two-dimensional image, and displays an image of the viewable area on the screen of the user terminal 30.

A voice advertisement area ID is assigned to each area on a map corresponding to the three-dimensional space realized by the program. A display area 111 of a video advertisement is provided in the three-dimensional space realized by the program, and a video advertisement area ID is assigned to this display area 111.

The user terminal 30 acquires data of a voice advertisement from an advertisement server 40, in association with each area on the map corresponding to the three-dimensional space. The user terminal 30 also acquires data of a video advertisement to be played back in the display area 111 from the advertisement server 40, in association with each display area 111 of the video advertisement. The user terminal 30 specifies a visual point position of the user in the three-dimensional space, and plays back a voice advertisement acquired for an area including the specified position, for example, as illustrated with a time $T_1$ of FIG. 17.

When the player 112 is moved in the three-dimensional space in accordance with the user operation, and the display area 111 is displayed on the screen of the user terminal 30, for example, as illustrated with a Time $T_2$ of FIG. 17, the user terminal 30 stops playback of the voice advertisement. The user terminal 30 plays back the video advertisement acquired for the display area 111, in the display area 111. When the video advertisement has a sound, the user terminal 30 plays back this sound.

When the player 112 is further moved in the three-dimensional space in accordance with the user operation, and the display area 111 is no longer displayed on the screen of the user terminal 30, for example, as illustrated with a time $T_3$ of FIG. 17, the user terminal 30 stops playback of the video advertisement. Then, the user terminal 30 specifies a visual point position of the user in the three-dimensional space, and plays back a voice advertisement acquired for the area including the specified position.

Accordingly, when the display area 111 is not displayed on the screen, the user terminal 30 plays back the voice advertisement acquired for an area including the user's visual point position. When the display area 111 is displayed on the screen, the user terminal stops playback of the voice advertisement, and plays back the video advertisement acquired for this display area 111, in the display area 111. As a result, the distribution device 20 of this embodiment can distribute a program for efficiently letting the user, executing the program (game) of the user terminal 30, view the voice advertisement or the video advertisement.

Configuration of Distribution System 10 and Distribution Device 20

Figure 18:
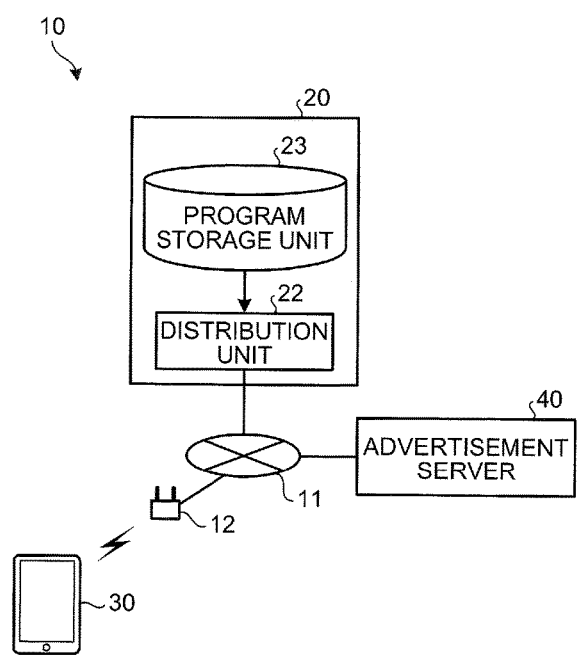
FIG. 18 is a system configuration diagram illustrating an example of a distribution system in the third embodiment.

FIG. 18 is a system configuration diagram illustrating an example of a distribution system in the third embodiment. The distribution system 10 in this embodiment includes the distribution device 20, the user terminal 30, and the advertisement server 40. Except those points as will be described below, in FIG. 18, the constituent elements with the same reference numerals as those of FIG. 2 have the same or similar functions as those of FIG. 2, thus will not be described again.

The distribution device 20 has a distribution unit 22 and a program storage unit 23. The program storage unit 23 stores a program (game) and data for use in this program. Upon reception of a request for a program from the user terminal 30 through the communication line 11, the distribution unit 22 retrieves the requested program from the program storage unit 23, and sends the retrieved program to the user terminal 30 through the communication line 11.

Configuration of User Terminal 30

Figure 19:
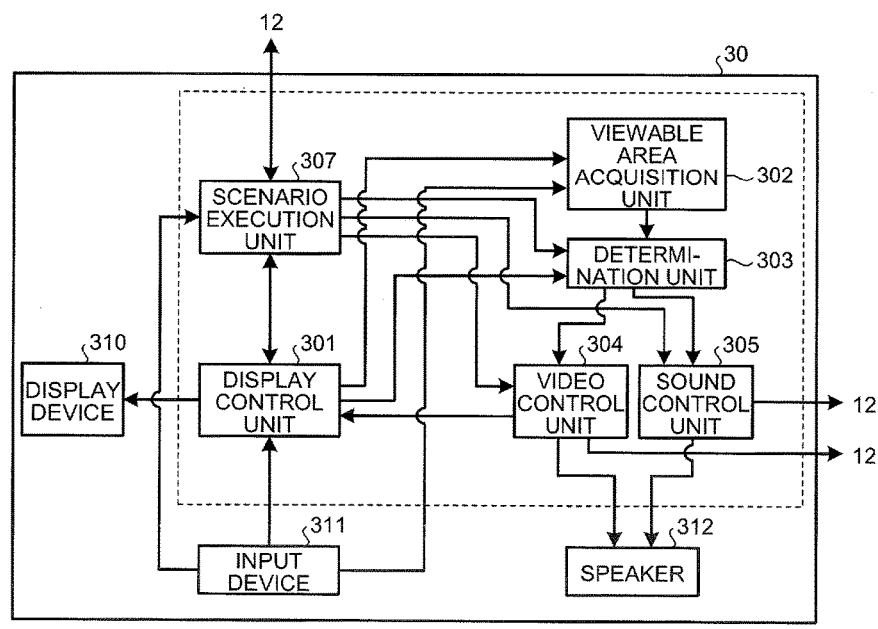
FIG. 19 is a block diagram illustrating an example of a functional configuration of a user terminal in the third embodiment.

FIG. 19 is a block diagram illustrating an example of a functional configuration of the user terminal in the third embodiment. The user terminal 30 in this embodiment has a display control unit 301, a viewable area acquisition unit 302, a determination unit 303, a video control unit 304, a sound control unit 305, a scenario execution unit 307, a display device 310, an input device 311, and a speaker 312. Except those points as will be described below, in FIG. 19, the constituent elements with the same reference numerals as those of FIG. 10 have the same or similar functions as those of FIG. 10, and thus will not be described again.

Of those functions of the user terminal 30, the display control unit 301, the viewable area acquisition unit 302, the determination unit 303, the video control unit 304, the sound control unit 305, and the scenario execution unit 307 are realized by a program distributed by the distribution device 20 executed by a calculation device of the user terminal 30.

The scenario execution unit 307 executes a scenario of, for example, a game, based on the program distributed from the distribution device 20. The scenario execution unit 307 determines a user's visual point position in the three-dimensional space realized by the program, in accordance with, for example, an operation from the user through the input device 311.

The scenario execution unit 307 acquires an object to be arranged around the user's visual point position from the distribution device 20 through the communication line 11, based on the scenario and the user's visual point position. The scenario execution unit 307 arranges the acquired object around the user's visual point position, and creates a three-dimensional space.

The scenario execution unit 307 sends an advertisement request to the advertisement server 40 through the communication line 11, to request a voice advertisement to be played back in each map area or data of a video advertisement to be played back in the display area 111, around the user's visual point position in the three-dimensional space. The advertisement request includes user attribute information and an area ID. The user attribute information is formed using user registration information performed, for example, at the start of executing the corresponding program. The area ID includes a voice advertisement area ID assigned to each map area and/or a video advertisement area ID assigned to the display area 111.

The scenario execution unit 307 receives an advertisement ID and advertisement data in association with each area ID, from the advertisement server 40 through the communication line 11. When the area ID is a video advertisement area ID, the scenario execution unit 307 receives information regarding an advertisement ID, video advertisement data, and reference positions, in association with each area ID, from the advertisement server 40. The scenario execution unit 307 sends information regarding the created three-dimensional space, and the advertisement ID and the advertisement data in association with each area ID (and also reference positions, if the area ID is a video advertisement area ID) to the display control unit 301.

The scenario execution unit 307 sends map information corresponding to the three-dimensional space and information regarding the visual point position of the user on the map to the determination unit 303. The map information corresponds to the voice advertisement area ID in association with each area on the map.

The scenario execution unit 307 compares the advertisement IDs sent from the advertisement server 40, in association with each area ID. When the same advertisement ID exists, the unit relates related information representing that there exists another related advertisement data, to this advertisement ID. If the area ID is a video advertisement area ID, the scenario execution unit 307 sends the corresponding area ID, the advertisement ID, and the video advertisement data to the video control unit 304. At this time, when the related information corresponds to the advertisement ID, the scenario execution unit 307 also sends this related information to the video control unit 304.

If the area ID is a voice advertisement area ID, the scenario execution unit 307 sends the area ID, the advertisement ID, and the voice advertisement data to the sound control unit 305. At this time, when the related information corresponds to the advertisement ID, the scenario execution unit 307 also sends this related information to the sound control unit 305.

The display control unit 301 determines the visual point position and visual line direction of the user, in accordance with the user operation, based on the information regarding the three-dimensional space created by the scenario execution unit 307. The display control unit 301 renders a two-dimensional image, for the three-dimensional space from the user visual point position to the visual line direction. The display control unit 301 specifies an area to be displayed on the screen of the user terminal 30 as a viewable area, in the created two-dimensional image, and displays an image of the viewable area on the display device 310.

If the display area 111 of the video advertisement is included in the created two-dimensional image, the display control unit 301 sends the area ID of the display area 111 and reference positions corresponding to this area ID to the determination unit 303. The reference positions sent from the advertisement server 40 are coordinates in the display area 111. The display control unit 301 converts them into, for example, coordinates in the created two-dimensional image, and sends them to the determination unit 303.

When the frame data of the played back a video advertisement is received together with the area ID from the video control unit 304, the display control unit 301 maps an image of the received frame data to the display area 111 corresponding to the received area ID, and sends the image to the display device 310.

Upon detection of a user operation through the input device 311, such as a touch panel or a hardware switch, the viewable area acquisition unit 302 acquires position information of the viewable area in the two-dimensional image from the display control unit 301. The viewable area acquisition unit 302 sends the acquired position information of the viewable area to the determination unit 303.

The determination unit 303 determines whether the display area 111 is included in the viewable area, using the position information of the viewable area and the reference positions corresponding to the display area 111 of the video advertisement, based on, for example, the coordinates in the two-dimensional image created by the display control unit 301. In this embodiment, like the first embodiment, for example, two reference positions correspond to the display area 111. The determination unit 303 determines that the display area 111 is included in the viewable area, when the entire reference positions corresponding to the display area 111 are included in the viewable area.

When the display area 111 is not included in the viewable area, the determination unit 303 instructs the video control unit 304 to stop playback of the video advertisement. The determination unit 303 specifies an area, on the map, that includes a user visual point position. The determination unit 303 sends a voice advertisement area ID corresponding to the specified area to the sound control unit 305.

When the display area 111 is included in the viewable area, the determination unit 303 instructs the sound control unit 305 to stop playback of the voice advertisement. The determination unit 303 sends a video advertisement area ID corresponding to this display area 111 to the video control unit 304. The processes of the video control unit 304 and the sound control unit 305 are the same as those of the first embodiment, and thus will not be described again.

Operation of User Terminal 30

Except those points as will be described below, an operation of the user terminal 30 in this embodiment is the same as the operation of the user terminal 30 in the first embodiment illustrated in FIG. 13, thus will not be described again.

The user terminal 30 acquires a program (game) from the distribution device 20, and executes this program, thereby starting the operation.

In Steps S100, S110, and S122 illustrated in FIG. 13, the viewable area acquisition unit 302 acquires the position information of the viewable area in the two-dimensional image created by the display control unit 301 from the display control unit 301, and sends the position information to the determination unit 303. The determination unit 303 determines whether the display area 111 is included in the viewable area, using the position information of the viewable area and the reference positions on the two-dimensional image corresponding to the display area 111 of the video advertisement, based on, for example, the coordinates in the two-dimensional image created by the display control unit 301.

In Step S114 of FIG. 13, the determination unit 303 specifies a map area including the user visual point position, and sends the voice advertisement area ID corresponding to the specified map area to the sound control unit 305. The sound control unit 305 starts playback of the voice advertisement data corresponding to the voice advertisement area ID received from the determination unit 303.

In Step S124 of FIG. 13, the determination unit 303 determines whether a map area from which another voice advertisement has been acquired is included in the viewable area (Step S124). When the map area with another voice advertisement acquired therefrom is included in the viewable area (Step S124: Yes), the determination unit 303 and the sound control unit 305 execute the procedure of Step S114. When the map area with another voice advertisement acquired therefrom is not included in the viewable area (Step S124: No), the viewable area acquisition unit 302 executes the procedure of Step S116 again.

Accordingly, the third embodiment has been described.

As obvious from the above descriptions, according to the distribution system 10 of this embodiment, it is possible to efficiently let the user, executing the program (game) in the user terminal 30, view the voice advertisement or the video advertisement.

Hardware Configuration of Distribution Device 20

Figure 20:
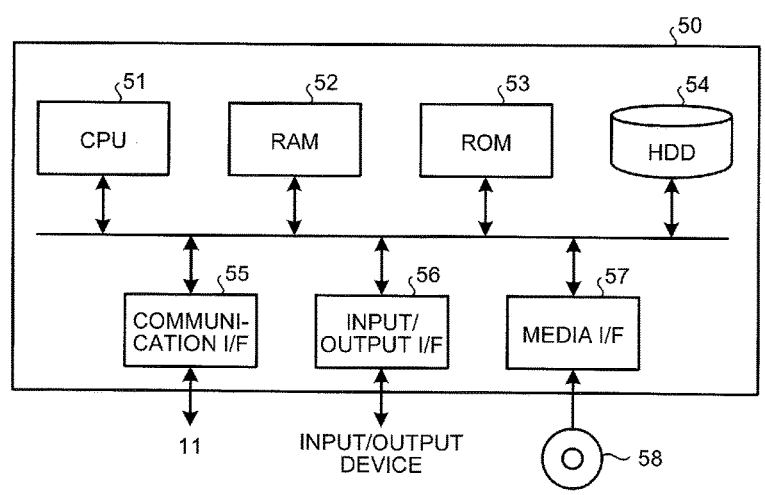
FIG. 20 is a hardware configuration diagram illustrating an example of a computer which realizes functions of a distribution device.

The distribution devices 20 in the first to third embodiments are realized by a computer 50 having a configuration of, for example, FIG. 20. FIG. 20 is a hardware configuration diagram illustrating an example of a computer which realizes the functions of the distribution device. A computer 50 includes a CPU (Central Processing Unit) 51, a RAM (Random Access Memory) 52, a ROM (Read Only Memory) 53, a HDD (Hard Disk Drive) 54, a communication interface (I/F) 55, an input/output interface (I/F) 56, and a media interface (I/F) 57.

The CPU 51 operates based on a program stored in the ROM 53 or the HDD 54, and controls the units. The ROM 53 stores a boot program executed by the CPU 51 at the activation of the computer 50 or a program depending on the hardware of the computer 50.

The HDD 54 stores the program executed by the CPU 51 and data used by this program. The communication interface 55 receives data from another unit device through the communication line 11, sends it to the CPU 51, and sends data generated by the CPU 51 to another unit device through the communication line 11.

The CPU 51 controls the output device, such as a display or printer, and the input device, such as a keyboard or a mouse, through the input/output interface 56. The CPU 51 acquires data from the input device through the input/output interface 56. The CPU 51 outputs the generated data to the output device through the input/output interface 56.

The media interface 57 reads the program or data stored on a recording medium 58, and provides the program or data to the CPU 51 through the RAM 52. The CPU 51 loads the program from the recording medium 58 to the RAM 52 through the media interface 57, and executes the loaded program. The recording medium 58 is any of, for example, an optical recording medium, such as a DVD (Digital Versatile Disc) or a PD (Phase change rewritable Disk), a magneto-optical recording medium, such as an MO (Magneto-Optical disk), a tape medium, a magnetic recording medium, or a semiconductor memory.

When the computer 50 functions as the distribution device 20 in the first or second embodiment, the CPU 51 of the computer 50 executes the program loaded to the RAM 52, thereby realizing the functions of the content data storage unit 21 and the distribution unit 22. The HDD 54 stores data of the content data storage unit 21.

When the computer 50 functions as the distribution device 20 in the third embodiment, the CPU 51 of the computer 50 executes the program loaded to the RAM 52, thereby realizing the functions of the distribution unit 22 and the program storage unit 23. The HDD 54 stores data of the program storage unit 23.

The CPU 51 of the computer 50 reads the programs from the recording medium 58, and executes them. However, it may acquire the programs from another device through the communication line 11, by way of example.

In the distribution device 20 in the first or second embodiment, the control program included in the content data stored in the content data storage unit 21 is read by the CPU of the user terminal 30. As a result, the user terminal 30 is caused to realize the functions of the viewable area acquisition unit 302, the determination unit 303, the video control unit 304, and the sound control unit 305.

In the distribution device 20 in the third embodiment, the program stored in the program storage unit 23 is read by the CPU of the user terminal 30. As a result, the user terminal 30 is caused to realize the functions of the display control unit 301, the viewable area acquisition unit 302, the determination unit 303, the video control unit 304, the sound control unit 305, and the scenario execution unit 307.

In the above-described embodiments, the voice advertisement has been described as an example of a sound. However, the sound may be any of music, a song, and a speaking sound. In the above-described embodiments, the video advertisement has been described as an example of video. However, the video may be any of a move and recorded video.

In the above-described third embodiment, the descriptions have been made to the program (game) by way of example. However, for example, the technique is applicable to a program for executing augmented reality in which information is added to and displayed with an image of actual world photographed by a camera. For example, as illustrated with a time $T_1$ of FIG. 21, when a display area 121 of a video advertisement is not displayed in an image 120 of the actual world photographed by a camera, the user terminal 30 plays back a voice advertisement acquired in relation to an area including the current location of the user terminal 30.

Figure 21:
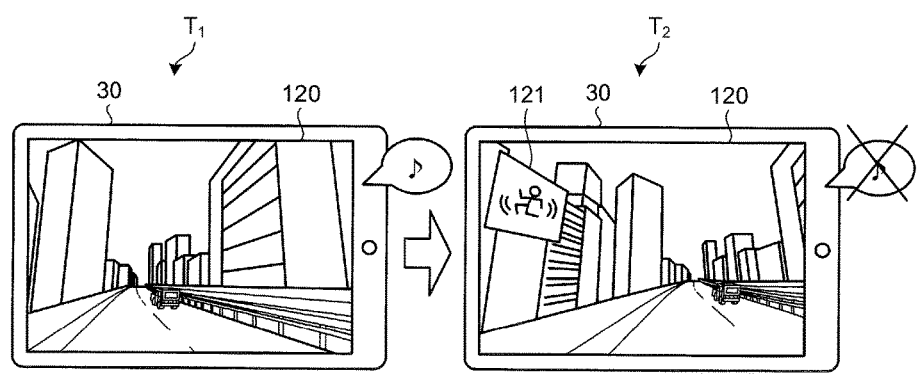
FIG. 21 is a schematic diagram for explaining a schematic example of a process in another embodiment.

For example, as illustrated with a time $T_2$ of FIG. 21, after the position or direction of the camera is changed, the display area 121 of the video advertisement is displayed in the image 120 of the actual world photographed by the camera. At this time, the user terminal 30 may stop playback of the voice advertisement, and play back the video advertisement acquired in relation to the display area 121, in this display area 121.

In the above-described embodiment, the descriptions have been made to the example, in which the distribution device 20 and the advertisement server 40 are configured in the form of different devices. However, the function of the advertisement server 40 may be provided in the distribution device 20.

In the above-described embodiments, the determination unit 303 determines whether the display area of the video advertisement is included in the viewable area. However, the functions of the determination unit 303 may be provided in the distribution device 20.

For example, in the first or second embodiment, the display control unit 301 sends the position information of the area for playing back the voice advertisement in the content 100, the area ID corresponding to the area, the area ID of the display area 102 of the video advertisement, and the information regarding the reference positions of the display area 102, to the distribution device 20 through the communication line 11. The viewable area acquisition unit 302 sends the acquired position information of the viewable area to the distribution device 20 through the communication line 11.

The determination unit provided in the distribution device 20 determines whether the display area 102 is included in the viewable area, using the position information of the viewable area and the reference positions corresponding to the display area 102 of the video advertisement. When it is determined that the display area 102 is included in the viewable area, the determination unit in the distribution device 20 instructs the sound control unit 305 to stop playback of the voice advertisement through the communication line 11. The determination unit in the distribution device 20 sends an area ID corresponding to the display area 102 included in the viewable area to the video control unit 304 through the communication line 11.

When it is determined that the display area 102 is not included in the viewable area, the determination unit in the distribution device 20 instructs the video control unit 304 to stop playback of the video advertisement, through the communication line 11. The determination unit in the distribution device 20 specifies an area in the content 100 included in the viewable area, and sends an area ID corresponding to the specified area to the sound control unit 305 through the communication line 11.

In this case, the determination unit is provided in the distribution device 20, in addition to the content data storage unit 21 and the distribution unit 22. However, this distribution unit may be provided in a device different from the distribution device 20. In this case, the distribution device 20 is managed by a media supplier, for example, a newspaper company, and another device having the determination unit provided therein may be managed by an advertisement distribution company.

In the above-described embodiment, upon reception of attribute information and an area ID from the user terminal 30, the providing unit 45 of the advertisement server 40 extracts advertisement data corresponding to this attribute information from the voice advertisement storage unit 42 or the video advertisement storage unit 43, and sends the advertisement data to the user terminal 30. However, the providing unit 45 may send a voice advertisement or a video advertisement corresponding to the information of the content to be displayed on the user terminal 30, to the user terminal 30.

For example, the data acquisition unit 300 extracts a feature word from the text of the content, and sends the extracted feature word to the advertisement server 40, together with the attribute information and the area ID. Feature words correspond to the advertisement IDs, in the voice advertisement storage unit 42 and the video advertisement storage unit 43, as illustrated in FIG. 6. The providing unit 45 specifies a table corresponding to the attribute information received from the user terminal 30, and extracts advertisement data (voice advertisement data or video advertisement data) that matches with the feature word received from the user terminal 30, from the specified table, and sends the advertisement data to the user terminal 30.

As a result, the user terminal 30 can play back the voice advertisement or the video advertisement of, for example, automobile manufacturers, for the content handling information regarding automobiles. In the voice advertisement storage unit 42 and the video advertisement storage unit 43 illustrated in FIG. 6, the feature word corresponding to the advertisement ID may be registered at the same time as when the advertiser registers the advertisement data in the voice advertisement storage unit 42 or the video advertisement storage unit 43. The function unit in the advertisement server 40 may analyze the registered advertisement data, and automatically extract and register the feature word.

According to the present invention, it is possible to provide content viewers with much information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system for controlling content in a network, the system comprising:
   a distribution server distributing a control program; and a
   a user terminal connected to the distribution server and being configured to receive the control program from the distribution server, the user terminal having a processor programmed to: (i) execute a display program that controls a display of the content, and (ii) upon receiving the control program from the distribution server, execute the control program to control the user terminal to:
      play back a sound in response to the content being present in an area specified by the display program,
      acquire a viewable area corresponding to the area specified by the display program in the content,
      determine whether a display area of a video included in the content is present within the viewable area, and
      stop playback of the sound and start the playback of the video in the display area in response to the display area being positioned in the viewable area.

2. The system according to claim 1, wherein the control program causes the processor to acquire, as the viewable area, an area displayed on a screen of the user terminal, in the area specified by the display program.

3. The system according to claim 1, wherein the video includes a sound recording, and the sound played back corresponds to the sound recording of the video.

4. The system according to claim 1, wherein the sound includes a voice advertisement, the video includes a video advertisement, and the voice advertisement and the video advertisement are disseminated by a single advertiser or by related advertisers, or have content related to each other.

5. The system according to claim 4, wherein the voice advertisement and the video advertisement are related to each other and represent one advertisement, and
   the processor executes a playback rate sending procedure to:
      send information representing that the one advertisement has been played back at a first rate to an external server, when the voice advertisement has been played back, and
      send information representing that the one advertisement has been played back at a second rate to an external server, when the video advertisement has been played back.

6. The system according to claim 1, wherein the control program causes the processor to play back a sound acquired for each area of the content included in the viewable area, in association with each area.

7. The system according to claim 1, wherein the control program causes the processor to:
   acquire information regarding reference positions set for the display area, and
   determine that the display area is positioned in the viewable area, when the reference positions are positioned in the viewable area.

8. The system according to claim 7, wherein the reference positions include a plurality of positions set in the display area, and
   the control program causes the processor to determine that the display area is positioned in the viewable area, when two or more reference positions of the plurality of reference positions are positioned in the viewable area.

9. The system according to claim 1, wherein the control program causes the processor to play back the sound, when the user terminal externally receives a signal representing that a sound output is allowed.

10. A distribution method between a server and a user terminal, the method comprising:
   distributing, by the server, a control program to the user terminal,
   in response to receiving and executing the control program by the user terminal, the user terminal:
      plays back a sound in response to the content being present in an area specified by a display program of the user terminal,
      acquires a viewable area corresponding to the area of the content specified by the display program in the content,
      determines whether a display area of a video included in the content is present within the viewable area, and
      stops playback of the sound and start playback of the video in the display area in response to the display area being positioned in the viewable area.

11. A non-transitory computer-readable storage medium storing: (i) an executable program for controlling a distribution server to execute a procedure for distributing content, and (ii) a control program for controlling display of content on a user terminal,
   the executable program having program instructions that cause the distribution server to perform a method comprising:
      distributing, by the distribution server, the control program to the user terminal, and
   the control program having program instructions that cause the user terminal to perform a method comprising:
      in response to the user terminal receiving the control program, controlling the user terminal to:
         play back a sound in response to the content being present in an area specified by a display program of the user terminal,
         acquire a viewable area corresponding to the area specified by the display program in the content,
         determine whether a display area of a video included in the content is present within the viewable area, and stop playback of the sound and start playback of the video in the display area in response to the display area being positioned in the viewable area.

* * * * *